United States Patent
Kim

(10) Patent No.: US 7,352,536 B2
(45) Date of Patent: Apr. 1, 2008

(54) PIVOT SHAFT FIXING STRUCTURE WITH PROJECTION INTEGRAL WITH COVER MEMBER AND DATA STORAGE DEVICE HAVING THE SAME

(75) Inventor: Myung-Il Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 11/086,848

(22) Filed: Mar. 22, 2005

(65) Prior Publication Data

US 2005/0248877 A1 Nov. 10, 2005

(30) Foreign Application Priority Data

May 7, 2004 (KR) .................. 10-2004-0032204

(51) Int. Cl.
*G11B 5/55* (2006.01)
(52) U.S. Cl. .................. 360/265.6; 360/99.08
(58) Field of Classification Search .. 360/97.02–97.04, 360/265.6, 99.08
See application file for complete search history.

(56) References Cited

U.S. PATENT DOCUMENTS 5,568,341 A 10/1996 Shikano .................. 360/97.02
6,466,400 B1* 10/2002 Iwahara et al. .......... 360/99.08
6,801,386 B1* 10/2004 Niroot et al. ............ 360/97.01
2005/0219763 A1* 10/2005 Jeong ..................... 360/265.6

OTHER PUBLICATIONS

Korean Patent Application No. 10-1997-0045614 to Seo, having Publication date of Apr. 6, 1999 (w/English Abtract page).
Korean Patent Application No. 10-1997-0045615 to Kim, having Publication date of Apr. 6, 1999 (w/English Abstract page).

* cited by examiner

*Primary Examiner*—A. J. Heinz
(74) *Attorney, Agent, or Firm*—Monica H. Choi

(57) ABSTRACT

A pivot shaft fixing structure of a data storage device includes a projection hole formed through a top surface of a pivot shaft that rotatably supports an actuator. In addition, a projection protrudes from a bottom surface of a cover member and fits into the projection hole. Furthermore, a deformable member is disposed around at least a portion of the projection and is disposed between the bottom surface of the cover member and the top surface of the pivot shaft. The pivot shaft fixing structure is advantageously applied within a hard disk drive.

18 Claims, 4 Drawing Sheets

PIVOT SHAFT FIXING STRUCTURE WITH PROJECTION INTEGRAL WITH COVER MEMBER AND DATA STORAGE DEVICE HAVING THE SAME

This application claims priority to Korean Patent Application No. 2004-32204, filed on May 7, 2004, in the Korean Intellectual Property Office, the disclosure of which is incorporated herein in its entirety by reference.

BACKGROUND OF THE INVENTION

1. Field of the Invention

The present invention relates generally to data storage devices such as a hard disk drive, and more particularly, to a pivot shaft fixing structure for securing a pivot shaft that rotatably supports an actuator.

2. Description of the Related Art

A hard disk drive (HDD) stores information in a computer system and reads/writes data from/on a rotating disk using a read/write head. The read/write head flies over a recording surface of the rotating disk and is moved to a desired position on the disk by an actuator to perform its function.

FIG. 1 shows a schematic exploded perspective view of a conventional HDD. FIG. 2 shows a partial cross-sectional view of a pivot shaft fixing structure of the conventional HDD of FIG. 1. Referring to FIGS. 1 and 2, a spindle motor 30 and an actuator 40 are mounted on a base member 11 of the HDD. The spindle motor 30 rotates a disk 20, and the actuator 40 moves a read/write head that reads/writes data from/on a desired position of the disk 20, The actuator 40 includes a pivot shaft 41 that is fixedly installed on the base member 11, a swing arm 42 that is rotatably coupled to the pivot shaft 41, a suspension 43 that is installed on one end portion of the swing arm 42, and a voice coil motor (VCM) 50 that rotates the swing arm 42. The suspension 43 moves a slider with the read/write head thereon across a surface of the disk 20.

The VCM 50 is controlled by a servo control system for rotating the swing arm 42 in a direction according to Fleming's Left Hand Rule due to an interaction between current flowing through a VCM coil 52 at the other end portion of the swing arm 42 and a magnetic field generated by magnets 54 and 56 facing the VCM coil 52. If the disk drive is turned on and the disk 20 begins to rotate, the VCM 50 rotates the swing arm 42 counter clockwise to move the read/write head over the recording surface of the disk 20. On the other hand, if the disk drive is turned off and the disk 20 stops rotating, the VCM 50 rotates the swing arm 42 clockwise to park the read/write head on a ramp 60.

A cover member 12 is secured to the base member 11 with a plurality of cover securing screws 19. The cover member 12 covers and protects components of the HDD including the disk 20, the actuator 40, etc., and prevents dust or humidity from entering the inside of the disk drive. A groove 13 is formed on the cover member 12 to reduce an interval between the disk 20 and the cover member 12 and thus to reduce vibrations of the disk 20.

The pivot shaft 41 may have various structures, and an example of the pivot shaft 41 is illustrated in the cross-sectional view of FIG. 2. Referring to FIG. 2, the pivot shaft 41 includes a first portion 41a fixed to the base member 11 and a second portion 41b screwed to an upper end of the first portion 41a.

In order to prevent the pivot shaft 41 and the actuator 40 from shaking due to external impacts and vibrations of the disk drive during the operation, the upper and lower ends of the pivot shaft 41 should be fixedly secure. Thus in the prior art, a screw hole 45 is formed through a top surface of the pivot shaft 41 (i.e., through a top surface of the second portion 41b), and a pivot mounting screw 49 is screwed into the screw hole 45 to fix the upper end of the pivot shaft 41 to the cover member 12. The pivot mounting screw 49 is screwed into the screw hole 45 also through a through-hole 15 formed in the cover member 12.

In the HDD of FIGS. 1 and 2, six cover securing screws 19 are used to secure the cover member 12 to the base member 11, and one pivot mounting screw 49 is used to fix the pivot shaft 41 to the cover member 12. Since many screws 19 and 49 are used in assembling the HDD, a long assembly time and high cost are incurred. In addition, metal particles are produced due to friction between metals when the many screws 19 and 49 are tightened or loosened. Such metal particles may scratch the surface of the disk 20 and damage the head, thereby deteriorating the function of the disk drive.

In general, the pivot mounting screw 49 is tightened using an electric screwdriver. If an impact is applied to the actuator 40 while the pivot mounting screw 49 is tightened with the electric screwdriver, the head and the disk 20 may collide with each other. As a result, the function of the head may deteriorate, and the surface of the disk 20 may be damaged. Further, if the torque of the electric screwdriver is not sufficient to tighten the pivot mounting screw 49, the pivot mounting screw 49 is likely to be loosened resulting in shaking of the pivot shaft 41 and the actuator 40.

Furthermore, if the pivot mounting screw 49 is screwed into the screw hole 45 with misalignment, vibrations may occur when the actuator 40 rotates and impact resistance may deteriorate leading to unreliability of the disk drive. In such case of poor insertion, the pivot mounting screw 49 needs to be disassembled from the screw hole 45. Such disassembly produces metal particles contaminating the disk drive. If the pivot mounting screw 49 cannot be disassembled from the screw hole 45 because of poor insertion, the disk drive may no longer be used. Such misalignment and poor insertion may occur if excessive torque is applied to the pivot mounting screw 49 by the electric screwdriver.

SUMMARY OF THE INVENTION

Accordingly, the present invention provides a pivot shaft fixing structure for securing a pivot shaft to the cover member without using a pivot mounting screw.

According to an aspect of the present invention, a pivot shaft fixing structure of a data storage device includes a projection hole formed through a top surface of a pivot shaft that rotatably supports an actuator. In addition, a projection protrudes from a bottom surface of a cover member and fits into the projection hole. Furthermore, a deformable member is disposed around at least a portion of the projection and is disposed between the bottom surface of the cover member and the top surface of the pivot shaft.

The present invention may be used to particular advantage when the data storage device is a HDD (hard disk drive) with the actuator moving at least one head of the HDD.

In another embodiment of the present invention, the deformable member has a ring shape and is comprised of one of rubber or a sponge.

In a further embodiment of the present invention, the projection is integrally formed with the cover member. In addition, a chamfer is formed at an end portion of the projection that is inserted into the projection hole.

In an example embodiment of the present invention, the pivot shaft includes a first portion fixed to the base member and a second portion screwed onto the first portion. In that case, the projection hole is formed through a top surface of the second portion. In another embodiment of the present invention, the pivot shaft is screwed to the base member.

Although the pivot shaft fixing structure is particularly advantageous within a hard disk drive, the pivot shaft fixing structure may also be applied within other type of data storage devices having a base member, a cover member secured to the base member, and an actuator rotatably coupled to the pivot shaft.

In this manner, the pivot shaft is fixedly secured to the cover member without a screw mechanism. In addition, the deformable member disposed between the bottom surface of the cover member and the top surface of the pivot shaft further fixes the pivot shaft to the cover member and absorbs shock for more stable operation of the disk drive.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, and 5 refer to elements having similar structure and/or function.

DETAILED DESCRIPTION OF THE INVENTION

Figure 1:
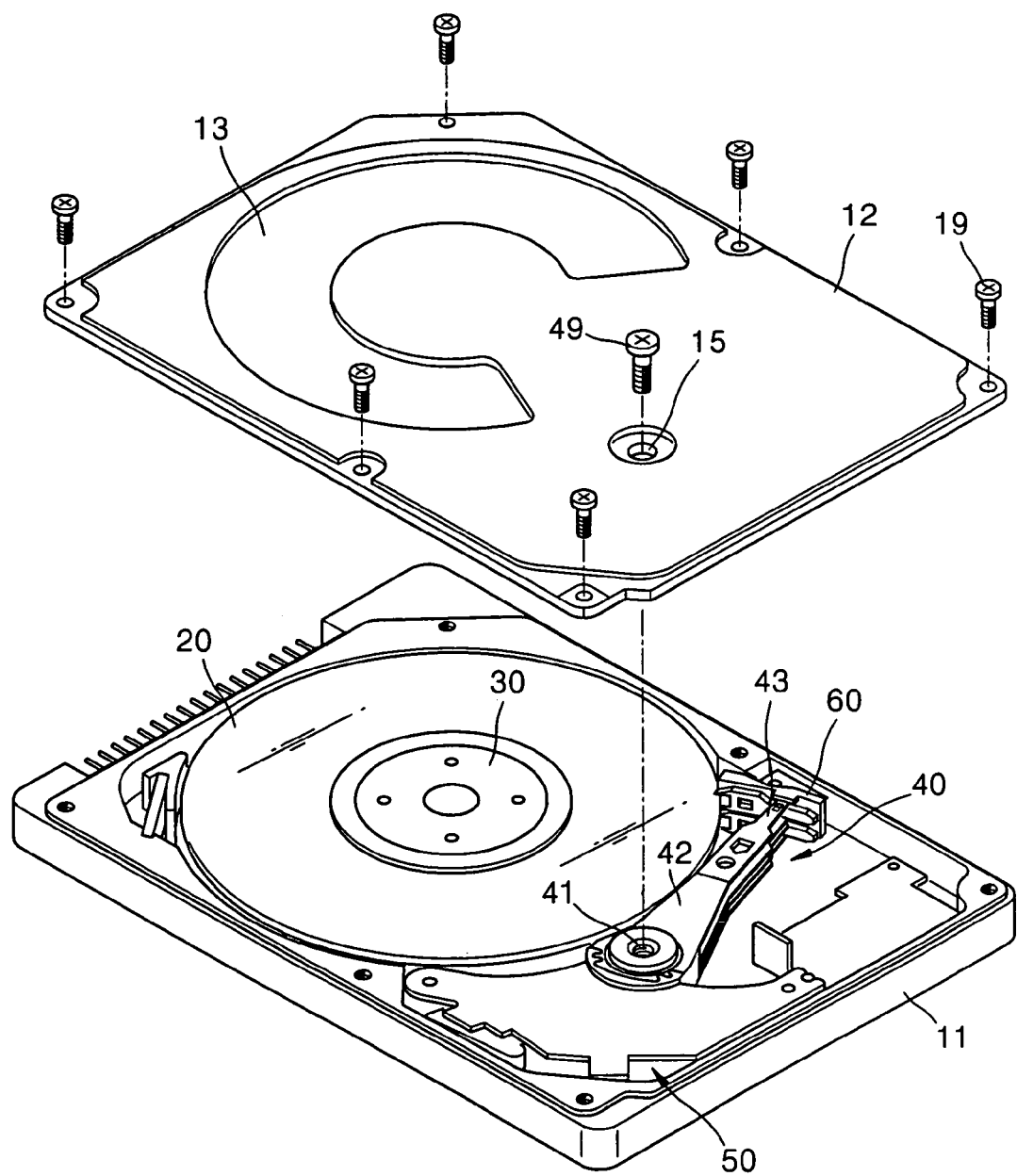
FIG. 1 shows a schematic exploded perspective view of a conventional hard disk drive (HDD)
Figure 2:
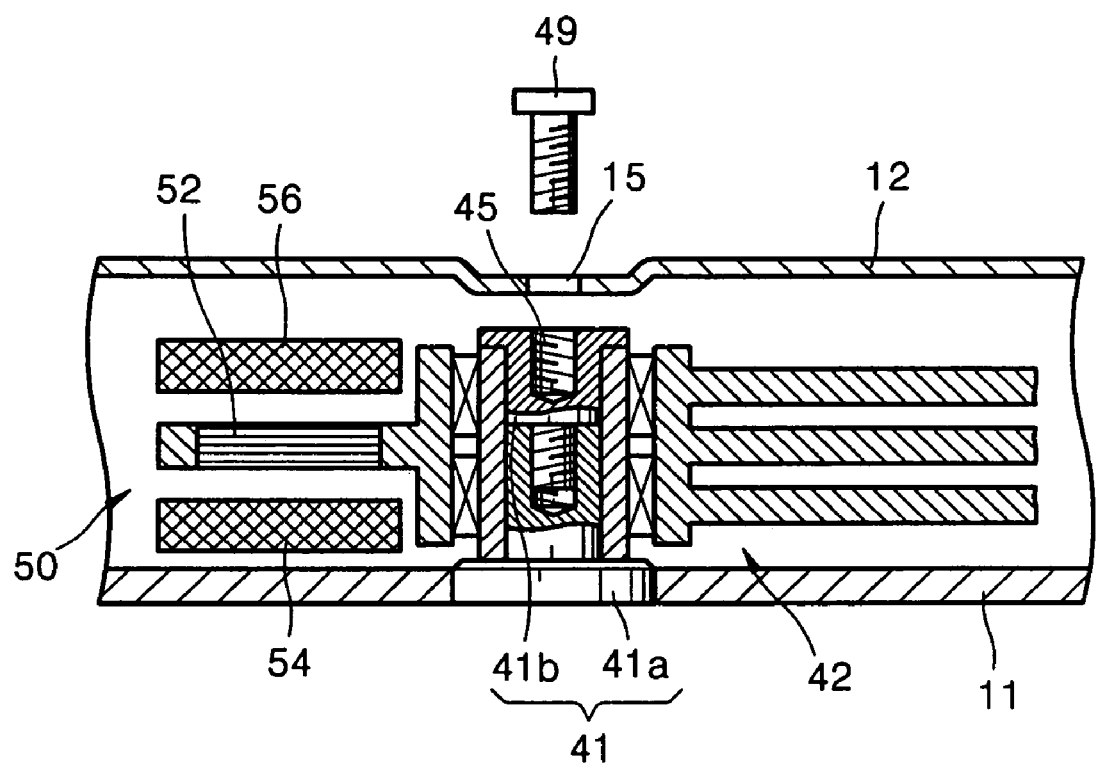
FIG. 2 shows a partial cross-sectional view of a pivot shaft fixing structure of the conventional HDD of FIG. 1.
Figure 3:
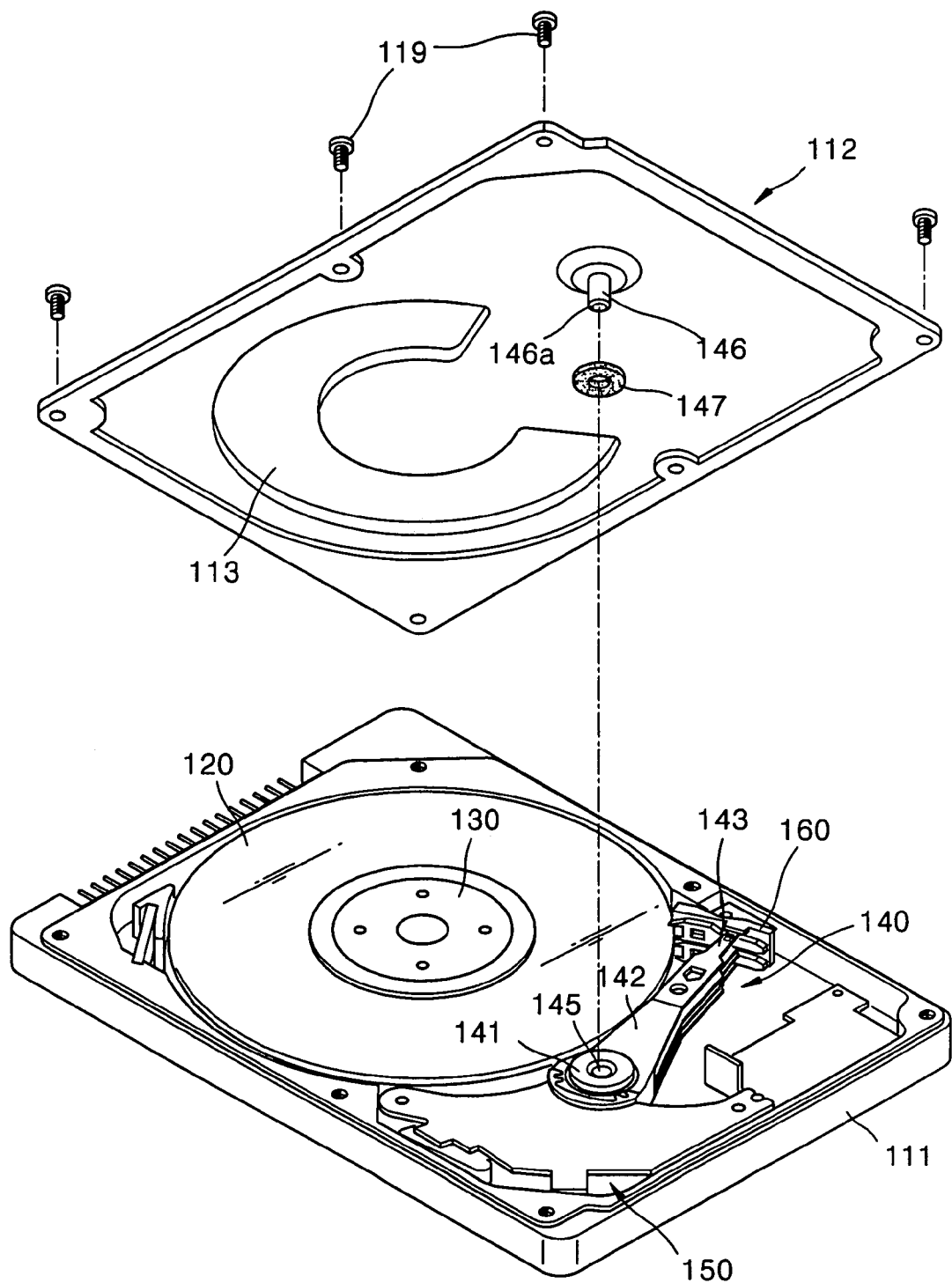
FIG. 3 shows an exploded perspective view of an HDD employing a pivot shaft fixing structure according to an embodiment of the present invention.
Figure 4:
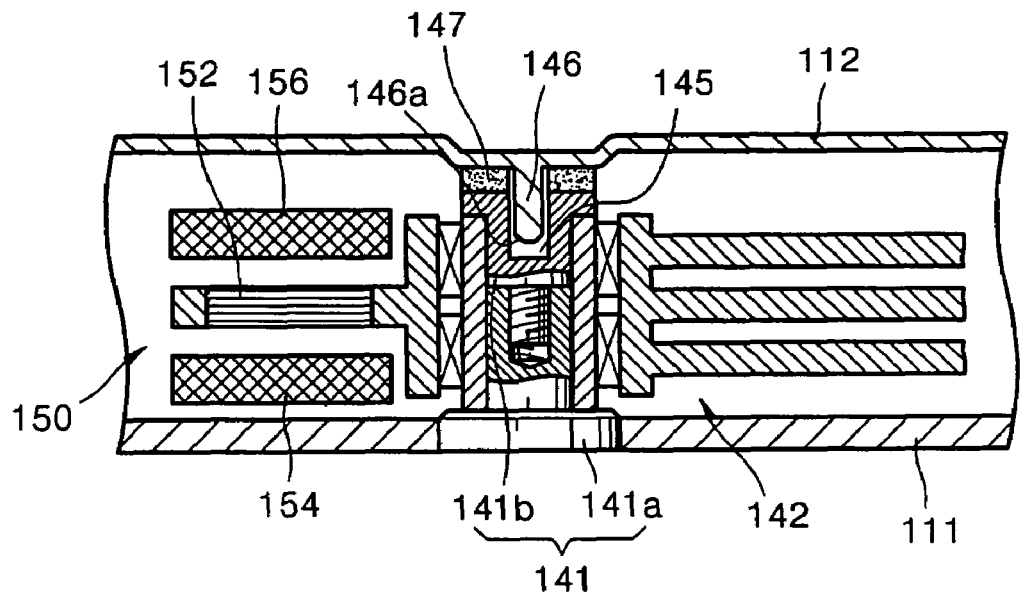
FIG. 4 shows a partial cross-sectional view of the pivot shaft fixing structure in FIG. 3, according to an embodiment of the present invention.

FIG. 3 shows an exploded perspective view of a hard disk drive (HDD) employing a pivot shaft fixing structure according to an embodiment of the present invention. FIG. 4 shows a partial cross-sectional view of the pivot shaft fixing structure of the HDD in FIG. 3. Referring to FIGS. 3 and 4, an HDD includes a base member 111, a cover member 112, an actuator 140, a pivot shaft 141 for rotatably supporting the actuator 140, and a pivot shaft fixing structure for fixing the pivot shaft 141 within the HDD.

The base member 111 is typically comprised of aluminium or aluminium alloy, and may be manufactured by a die casting process. A space for receiving a data storage disk 120, a spindle motor 130, and the actuator 140 is formed on a top surface of the base member 111. The spindle motor 130 is mounted on the base member 111 of the disk drive. At least one disk 120 is mounted to a hub of the spindle motor 130 and rotates together with the hub.

The actuator 140 moves a read/write head for reading/writing data from/to a predetermined position on the disk 120. The actuator 140 includes a swing arm 142, a suspension 143, and a voice coil motor (VCM) 150. The swing arm 142 is rotatably coupled to the pivot shaft 141 that is fixedly installed on the base member 111. The suspension 143 at a leading end portion of the swing arm 142 moves a slider with the read/write head thereon across a surface of the disk 120.

The VCM 150 provides a driving force for rotating the swing arm 142, and includes a VCM coil 152 and magnets 154 and 156. The VCM coil is coupled to a trailing end portion of the swing arm 142, and the magnets 154 and 156 are disposed under and over the VCM coil 152 to face the VCM coil 152. The VCM 150 is controlled by a servo control system for rotating the swing arm 142 in a direction according to Fleming's Left Hand Rule due to an interaction between current flowing through the VCM coil 152 and a magnetic field generated by the magnets 154 and 156.

That is, if the disk drive is turned on and the disk 120 begins to rotate, the VCM 150 rotates the swing arm 142 counter clockwise to move the head over the recording surface of the disk 120. On the other hand, if the disk drive is turned off and the disk 120 stops rotating, the VCM 150 rotates the swing arm 142 clockwise to separate the head from the disk 120. In that case, the head separated from the recording surface of the disk 120 is parked on a ramp 160 disposed outside the disk 120.

The cover member 112 is secured to the base member 111 for covering and protecting the components of the HDD including the disk 120, the spindle motor 130, the actuator 140, etc. In addition, the cover member 112 prevents dust or humidity from entering the inside of the disk drive, and also prevents noises generated in the disk drive from propagating. The cover member 112 is secured to the base member 111 with a plurality of cover securing screws 119 (i.e., six screws 119).

A groove 113 may be formed on the cover member 112. The groove 113 decreases an interval between the disk 120 and the cover member 112 to reduce vibrations of the disk 120 and to increase the stiffness of the cover member 112.

The pivot shaft fixing structure fixes the pivot shaft 141 to the cover member 112, and prevents the pivot shaft 141 and the actuator 140 from shaking due to external impacts and vibrations of the disk drive during the operation. The pivot shaft fixing structure includes a projection 146 that protrudes from a bottom surface of the cover member 112. In addition, the pivot shaft fixing structure includes a projection hole 145 that is formed through a top surface of the pivot shaft 141 with the projection being inserted into the projection hole for coupling the pivot shaft 141 to the cover member 112. The projection hole is formed through a center of the pivot shaft 141 in one embodiment of the present invention.

Furthermore, the pivot shaft fixing structure includes a deformable member 147 disposed around the periphery of the projection 146 and between the bottom surface of the cover member 112 and the top surface of the pivot shaft 141. The deformable member 147 is attached to the bottom surface of the cover member 112 around the periphery of the projection 146 in one embodiment of the present invention. The deformable member 147 is comprised of an elastic material such as rubber, or a compressive material such as a sponge, that are shock-absorbing in one embodiment of the present invention. In an example embodiment of the present invention, the deformable member 147 has a ring shape.

The projection 146 protrudes from the bottom surface of the cover member 112 by a predetermined length to be coaxially aligned with the projection hole 145. In an embodiment of the present invention, a chamfer 146a is formed at an end portion of the projection 146 that is inserted into the projection hole 145 for easier insertion.

The projection 146 is integrally formed with the cover member 112 in one embodiment of the present invention. In detail, the cover member 112 is generally manufactured by pressing a stainless steel plate. The projection 146 may be integrally formed with the cover member 112 by pressing when the cover member 112 is manufactured. However, the present invention may also be practiced when the projection 146 is not integral with the cover member 112.

The pivot shaft 141 rotatably supports the swing arm 142 of the actuator 142. In a first embodiment of the present invention, the pivot shaft 141 includes a first portion 141a fixed to the base member 111 and a second portion 141b screwed to the first portion 141a. A lower end of the first portion 141a is fixed to the base member 111. For example, the lower end of the first portion 141a may be integrally formed with the base member 111. An upper end of the first portion 141a is screwed to the second portion 141b.

When the cover member 112 is secured to the base member 111, the projection 146 formed on the cover member 112 is inserted into the projection hole 145. It is preferable that a diameter of the projection hole 145 is just slightly greater than a diameter of the projection 146 for prevention of deviation of the pivot shaft 141 but for easy insertion even with some misalignment between the projection 146 and the projection hole 145.

When the cover member 112 is secured to the base member 111, the deformable member 147 elastically presses the top surface of the pivot shaft 141 such that the upper portion of the pivot shaft 141 is firmly fixed to the cover member 112. In this manner, the lower end portion of the pivot shaft 141 is fixed to the base member 111, and the upper end portion of the pivot shaft 141 is firmly fixed to the cover member 112 by the projection 146 and the deformable member 147. Thus, the pivot shaft 141 is prevented from shaking due to external impacts or vibrations of the disk drive during the operation. In particular, since the deformable member 147 is comprised of material that is elastic and/or shock-absorbing, impacts or vibrations to the actuator 146 through the pivot shaft 141 is more effectively reduced for less shaking of the pivot shaft 141 and the actuator 141.

Figure 5:
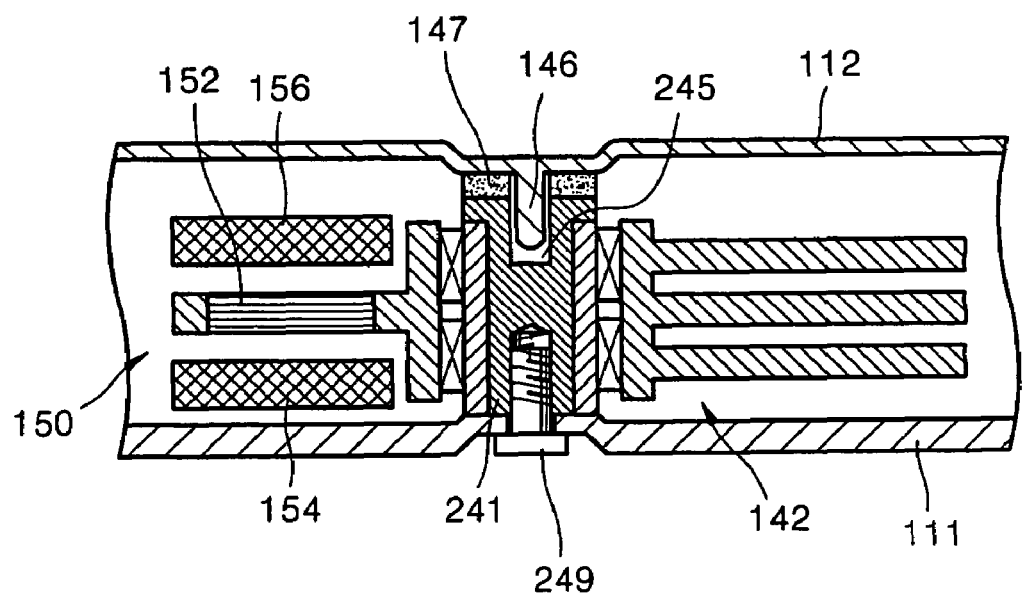
FIG. 5 shows a partial cross-sectional view of the pivot shaft fixing structure in FIG. 3, according to another embodiment of the present invention.

FIG. 5 shows a partial cross-sectional view of the pivot shaft fixing structure of the HDD according to another embodiment of the present invention. Referring to FIG. 5, the HDD may include a pivot shaft 241 of a single body. A lower end of the pivot shaft 241 is screwed to the base member 111 with a pivot mounting screw 249 for fixedly installing the pivot shaft 241 on the base member 111. The projection 146 protruding from the cover member 112 is inserted into a projection hole 245 formed through a top surface of the pivot shaft 241.

However, the pivot shaft fixing structure according to the present invention may also be applied to pivot shafts having various structures other than the pivot shafts 141 and 241 illustrated in FIGS. 4 and 5.

As described above, since the number of screws used in assembling the HDD is reduced, assembly time, cost, and contamination from metal particles are reduced. Since an electric screwdriver is not used to tighten a pivot mounting screw, deterioration and/or damage of the head and the surface of the disk from impact applied to the actuator by the electric screwdriver are avoided. Furthermore, the problem of the pivot mounting screw being stuck in the screw hole is avoided with the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A pivot shaft fixing structure of a data storage device, comprising:
   a projection hole formed through a top surface of a pivot shaft that rotatably supports an actuator;
   a projection protruding from a bottom surface of a cover member and fitting into the projection hole, wherein the projection is formed integral as one material with the cover member; and
   a deformable member disposed around at least a portion of the projection and disposed between the bottom surface of the cover member and the top surface of the pivot shaft.

2. The pivot shaft fixing structure of claim 1, wherein the data storage device is a HDD (hard disk drive), and wherein the actuator moves at least one head of the HDD.

3. The pivot shaft fixing structure of claim 1, wherein the deformable member has a ring shape.

4. The pivot shaft fixing structure of claim 1, wherein the deformable member is comprised of one of rubber or a sponge.

5. The pivot shaft fixing structure of claim 1, wherein the pivot shaft is screwed to a base member of the data storage device.

6. The pivot shaft fixing structure of claim 1, wherein a chamfer is formed at an end portion of the projection that is inserted into the projection hole.

7. The pivot shaft fixing structure of claim 1, wherein the pivot shaft includes a first portion fixed to a base member of the data storage device and includes a second portion screwed onto the first portion, and wherein the projection hole is formed through a top surface of the second portion.

8. A data storage device comprising:
   a base member;
   a cover member secured to the base member;
   a pivot shaft secured to the base member;
   an actuator rotatably coupled to the pivot shaft; and
   a pivot shaft fixing structure including:
      a projection hole formed through a top surface of the pivot shaft;
      a projection protruding from a bottom surface of the cover member and fitting into the projection hole, wherein the projection is formed integral as one material with the cover member; and
      a deformable member disposed around at least a portion of the projection and disposed between the bottom surface of the cover member and the top surface of the pivot shaft.

9. The data storage device of claim 8, wherein the pivot shaft is screwed to the base member.

10. The data storage device of claim 8, wherein the data storage device is a HDD (hard disk drive), and wherein the actuator moves at least one head of the HDD.

11. The data storage device of claim 8, wherein the deformable member has a ring shape.

12. The data storage device of claim 8, wherein the deformable member is comprised of one of rubber or a sponge.

13. The data storage device of claim 8, wherein the pivot shaft includes a first portion fixed to the base member and a second portion screwed onto the first portion, and wherein the projection hole is formed through a top surface of the second portion.

14. The data storage device of claim 8, wherein a chamfer is formed at an end portion of the projection that is inserted into the projection hole.

15. A pivot shaft fixing structure of a data storage device, comprising:
means for coupling a pivot shaft of the data storage device to a cover member of the data storage device with a projection that is formed integral as one material with the cover member; and
a deformable member disposed between a bottom surface of the cover member and a top surface of the pivot shaft and disposed substantially near the means for coupling.

16. The pivot shaft fixing structure of claim 15, wherein the deformable member has a ring shape.

17. The pivot shaft fixing structure of claim 15, wherein the deformable member is comprised of one of rubber or a sponge.

18. The pivot shaft fixing structure of claim 15, wherein the data storage device is a HDD (hard disk drive), and wherein the actuator moves at least one head of the HDD.

* * * * *